(12) United States Patent
Park et al.

(10) Patent No.: US 12,283,663 B2
(45) Date of Patent: Apr. 22, 2025

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Sol Ji Park, Daejeon (KR); Jung Hoon Lee, Daejeon (KR); Chul Haeng Lee, Daejeon (KR); Yoo Sun Kang, Daejeon (KR); Jae Won Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 52 days.

(21) Appl. No.: 18/281,485

(22) PCT Filed: Sep. 14, 2022

(86) PCT No.: PCT/KR2022/013726
§ 371 (c)(1),
(2) Date: Sep. 11, 2023

(87) PCT Pub. No.: WO2023/043190
PCT Pub. Date: Mar. 23, 2023

(65) Prior Publication Data
US 2024/0047748 A1 Feb. 8, 2024

(30) Foreign Application Priority Data
Sep. 14, 2021 (KR) .................. 10-2021-0122326

(51) Int. Cl.
*H01M 10/0525* (2010.01)
*C07F 9/54* (2006.01)
*H01M 4/505* (2010.01)
*H01M 4/525* (2010.01)
*H01M 10/0567* (2010.01)
*H01M 10/0568* (2010.01)
*H01M 10/0569* (2010.01)
*H01M 4/02* (2006.01)

(52) U.S. Cl.
CPC ....... *H01M 10/0567* (2013.01); *C07F 9/5428* (2013.01); *H01M 4/505* (2013.01); *H01M 4/525* (2013.01); *H01M 10/0525* (2013.01); *H01M 10/0568* (2013.01); *H01M 10/0569* (2013.01); *H01M 2004/028* (2013.01); *H01M 2300/0037* (2013.01)

(58) Field of Classification Search
CPC ......... H01M 10/0567; H01M 10/0525; H01M 10/0568; H01M 10/0569; H01M 4/525; H01M 2004/028; H01M 2300/0037
See application file for complete search history.

(56) References Cited

U.S. PATENT DOCUMENTS

| | | |
|---|---|---|
| 6,582,849 B1 | 6/2003 | Heider et al. |
| 2006/0035137 A1* | 2/2006 | Maruo .............. H01M 10/0569 429/188 |
| 2008/0258113 A1 | 10/2008 | Clyburne et al. |
| 2009/0053597 A1 | 2/2009 | Tsunashima et al. |
| 2010/0006794 A1 | 1/2010 | Hawkins et al. |
| 2010/0006797 A1 | 1/2010 | Hawkins et al. |
| 2010/0009255 A1 | 1/2010 | Hawkins et al. |
| 2010/0068604 A1 | 3/2010 | Hawkins et al. |
| 2010/0118598 A1 | 5/2010 | Hawkins et al. |
| 2013/0092866 A1 | 4/2013 | Rupert et al. |
| 2013/0095351 A1 | 4/2013 | Gellett et al. |
| 2013/0095392 A1 | 4/2013 | Shin et al. |
| 2015/0093655 A1* | 4/2015 | Kozelj ................. H01G 11/62 548/406 |
| 2015/0166587 A1 | 6/2015 | Zheng |
| 2016/0315351 A1 | 10/2016 | Kotou et al. |
| 2020/0144672 A1 | 5/2020 | Ji et al. |
| 2021/0135290 A1 | 5/2021 | Lee et al. |
| 2022/0123297 A1 | 4/2022 | Lee et al. |

FOREIGN PATENT DOCUMENTS

| | | |
|---|---|---|
| JP | 2002208433 A | 7/2002 |
| JP | 2009054311 A | 3/2009 |
| JP | 2014133734 A | 7/2014 |
| JP | 6430365 B2 | 11/2018 |
| JP | 2019169238 A | 10/2019 |
| KR | 20030061219 A | 7/2003 |
| KR | 100685563 B1 | 2/2007 |

(Continued)

OTHER PUBLICATIONS

International Search Report for PCT/KR2022/013726 mailed Dec. 13, 2022. 4 pages.

(Continued)

*Primary Examiner* — Osei K Amponsah
(74) *Attorney, Agent, or Firm* — Lerner David LLP

(57) ABSTRACT

A non-aqueous electrolyte solution for a lithium secondary battery includes a compound represented by Formula 1 as follows, a lithium salt, and an organic solvent; and a lithium secondary battery including the same:

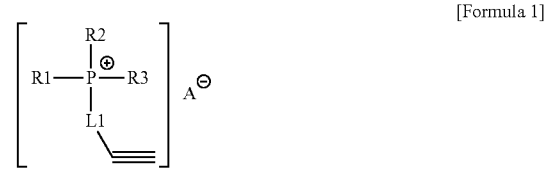

[Formula 1]

wherein R1 to R3, L1 and A⁻ are described herein.

14 Claims, No Drawings

(56) References Cited

FOREIGN PATENT DOCUMENTS

| KR | 20150003208 A | 1/2015 |
| KR | 20150092271 A | 8/2015 |
| KR | 20160100964 A | 8/2016 |
| KR | 20200114403 A | 10/2020 |
| KR | 20210052812 A | 5/2021 |
| KR | 20210061865 A | 5/2021 |
| WO | 2020017318 A1 | 1/2020 |

OTHER PUBLICATIONS

Nikitin E V et al: "Electrochemical synthesis of diphosphonium salts, their reactivity and role in organic electrosynthesis", Electrochimica Acta, Elsevier, Amsterdam, NL, vol. 42, No. 13, Jan. 1, 1997 (Jan. 1, 1997), pp. 2217-2224, XP004061817.
EESR for Application No. 22870274.2 dated Mar. 11, 2024. 7 pgs.

* cited by examiner

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2022/013726 filed on Sep. 14, 2022, which claims priority from Korean Patent Application No. 10-2021-0122326 filed on Sep. 14, 2021, all the disclosures of which are incorporated by reference herein.

TECHNICAL FIELD

The present invention relates to a non-aqueous electrolyte solution for a lithium secondary battery and a lithium secondary battery including the same.

BACKGROUND ART

Lithium secondary batteries can not only be miniaturized but also have high energy density and operating voltage, and thus have been applied to various fields such as mobile devices, electronic products, and electric vehicles.

A lithium secondary battery is generally prepared by a method in which, after an electrode assembly is formed by disposing a separator between a positive electrode including a positive electrode active material formed of a transition metal oxide containing lithium, and a negative electrode including a negative electrode active material capable of storing lithium ions, the electrode assembly is inserted into a battery case, a non-aqueous electrolyte solution, which becomes a medium for transferring the lithium ions, is injected thereinto, and the battery case is then sealed.

Propylene carbonate is mainly used as an organic solvent of the non-aqueous electrolyte solution, but there is a limitation in that propylene carbonate may cause irreversible decomposition reaction with a graphite material, and thus ethylene carbonate has recently been widely used to solve this limitation.

However, ethylene carbonate has another limitation in that the temperature of use is limited due to the high melting point of ethylene carbonate, and it may cause significant degradation in battery performance at low temperatures. Accordingly, there is a need to develop an electrolyte solution for a lithium secondary battery that may be stably driven in various environments by remedying these limitations.

In addition, as the fields of utilization of lithium secondary batteries are diversified, a reduction in charging time for user convenience has emerged as a main task.

DISCLOSURE OF THE INVENTION

Technical Problem

An aspect of the present invention provides a non-aqueous electrolyte solution which is for a lithium secondary battery and includes a phosphonium salt additive, thereby reducing the amount of gas generated at high temperatures, and contributing to the improvement in fast charging performance and low-temperature output characteristics, and a lithium secondary battery including the non-aqueous electrolyte solution.

Technical Solution

According to an aspect of the present invention, there is provided a non-aqueous electrolyte solution including: a lithium salt; an organic solvent; and a compound represented by Formula 1 as follows.

[Formula 1]

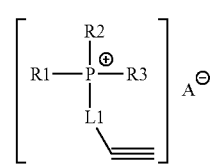

In Formula 1,

R1 to R3 are each independently an alkyl group having 1 to 6 carbon atoms and optionally substituted with a fluorine, an alkenyl group having 2 to 6 carbon atoms and optionally substituted with a fluorine, an alkynyl group having 2 to 6 carbon atoms and optionally substituted with a fluorine, or —R'OSi(R4)$_3$;

R' above is a direct linkage, an alkylene group having 1 to 6 carbon atoms and optionally substituted with a fluorine, an alkenylene group having 2 to 6 carbon atoms and optionally substituted with a fluorine, or an alkynylene group having 2 to 6 carbon atoms and optionally substituted with a fluorine;

R4 is an alkyl group having 1 to 6 carbon atoms;

L1 is —(CO)$_m$O(CH$_2$)$_n$—;

m is 0 or 1;

n is an integer of 0 to 5; and

A$^-$ is (CF$_3$SO$_2$)$_2$N$^-$, (FSO$_2$)$_2$N$^-$, PF$_6^-$, PO$_2$F$_2^-$, BF$_4^-$, ClO$_4^-$, (C$_2$O$_4$)BF$_2^-$, HSO$_4^-$, CF$_3$SO$_3^-$, (C$_2$F$_5$SO$_2$)$_2$N$^-$, C(CF$_2$SO$_2$)$_3^-$, AsF$_6^-$, SbF$_6^-$, AlCl$_4^-$, NbF$_6^-$, or CF$_3$CO$_2^-$.

According to another aspect of the present invention, there is provided a lithium secondary battery including: a positive electrode including a positive electrode active material; a negative electrode including a negative electrode active material; a separator disposed between the negative electrode and the positive electrode; and the non-aqueous electrolyte solution for a lithium secondary battery.

Advantageous Effects

In one aspect, the present invention can provide a non-aqueous electrolyte solution which is for a lithium secondary battery and contributes to the strengthening of a film on an electrode by including a phosphonium salt additive to improve bulk properties through the interaction with a solvent.

In addition, the present invention according to another aspect can provide a lithium secondary battery which has excellent capacity retention during the fast charging and excellent output at low temperatures, and generates less gas during high-temperature storage, by including the non-aqueous electrolyte for a lithium secondary battery.

DETAILED DESCRIPTION

Hereinafter, the present invention will be described in more detail.

Generally, a non-aqueous electrolyte solution for a lithium secondary battery has a limitation in that the output characteristics deteriorates in a low-temperature environment due to the limit of the driving temperature and the amount of gas generated during high-temperature storage is increased.

According to one aspect of the present invention, in order to solve this limitation, a phosphonium salt additive for a lithium secondary battery has been developed. Specifically, it was confirmed that the phosphonium salt additive contributes to the improvement in the bulk properties of the electrolyte solution through the interaction with a solvent of the electrolyte solution, and can improve the temperature sensitivity by reducing the side reaction with the solvent through the film modification at a positive electrode, thereby improving the performance in a low temperature environment and reducing the amount of gas generated during high-temperature storage.

In addition, it has been found that the phosphonium salt additive includes an alkyne functional group that can be reduced at the terminal thereof, and thus can function not only at the positive electrode but also at the negative electrode, and can form an electrode film having a resistance lower than the electrode film formed by the existing electrolyte solution and the additive for a lithium secondary battery, and thus battery performance such as lifetime during fast charging can be improved as the movement of $Li^+$ becomes smooth.

Hereinafter, various embodiments constituting the present invention will be described in more detail.

Non-Aqueous Electrolyte Solution

In one aspect, the present invention provides a non-aqueous electrolyte solution for a lithium secondary battery, the non-aqueous electrolyte solution including a lithium salt, an organic solvent, and a compound represented by Formula 1 below.

Hereinafter, each component of the non-aqueous electrolyte solution will be described in detail.

(1) Compound Represented by Formula 1

The non-aqueous electrolyte solution for a lithium secondary battery of the present disclosure includes a compound represented by Formula 1:

[Formula 1]

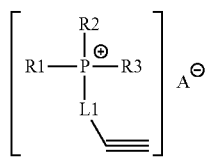

In Formula 1,

R1 to R3 are each independently an alkyl group having 1 to 6 carbon atoms and optionally substituted with a fluorine, an alkenyl group having 2 to 6 carbon atoms and optionally substituted with a fluorine, an alkynyl group having 2 to 6 carbon atoms and optionally substituted with a fluorine, or —R'OSi(R4)$_3$;

R' above is a direct linkage, an alkylene group having 1 to 6 carbon atoms and optionally substituted with a fluorine, an alkenylene group having 2 to 6 carbon atoms and optionally substituted with a fluorine, or an alkynylene group having 2 to 6 carbon atoms and optionally substituted with fluorine;

R4 is an alkyl group having 1 to 6 carbon atoms;

L1 is —(CO)$_m$O(CH$_2$)$_n$—;

m is 0 or 1;

n is an integer of 0 to 5; and $A^-$ is $(CF_3SO_2)_2N^-$, $(FSO)_2N^-$, $PF_6^-$, $PO_2F_2^-$, $BF_4^-$, $ClO_4^-$, $(C_2O_4)BF_2^-$, $HSO_4^-$, $CF_3SO_3^-$, $(C_2F_5SO_2)_2N^-$, $C(CF_2SO_2)_3^-$, $AsF_6^-$, $SbF_6^-$, $AlCl_4^-$, $NbF_6^-$, or $CF_3CO_2^-$.

In an embodiment of the present invention, L1 above may be —O(CH$_2$)$_n$— or —COO(CH$_2$)$_n$—.

In an embodiment of the present invention, the compound represented by Formula 1 may be represented by Formula 1-1 or Formula 1-2 as follows:

[Formula 1-1]

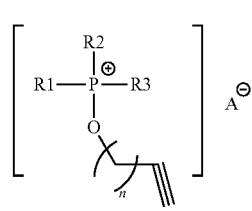

[Formula 1-2]

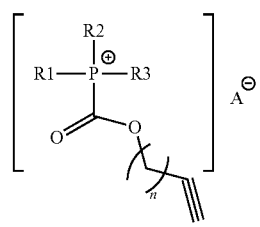

In Formula 1-1 and Formula 1-2,

R1 to R3, n, and A - are the same as defined in Formula 1.

In an embodiment of the present invention, R1 to R3 above may each independently be —R'OSi(CH$_3$)$_3$, and R' may be a direct linkage or an alkylene group having 1 to 6 carbon atoms, preferably an alkylene group having 1 to 3 carbon atoms, more preferably a methylene group.

In another embodiment of the present invention, each of R1 to R3 may be an ethyl group.

In an embodiment of the present invention, the compound represented by Formula 1 may be represented by any one among Formulae 1A to 1D as follows:

[Formula 1A]

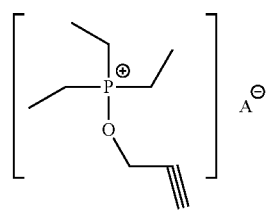

[Formula 1B]

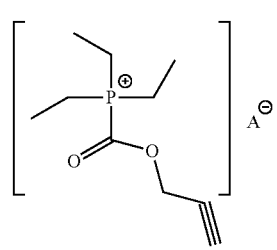

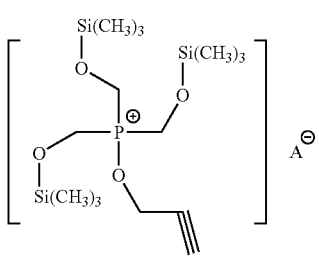

[Formula 1C]

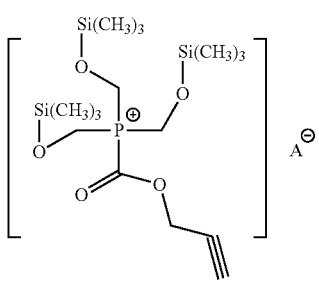

[Formula 1D]

In an embodiment of the present invention, $A^-$ may be $(CF_3SO_2)_2N^-$ or $(FSO_2)_2N^-$. In this case, compared to other anions such as $PF_6^-$, the thermal safety may be excellent and the resistance may be low.

In an embodiment of the present invention, an amount of the compound represented by Formula 1 may be in a range of 0.05 wt % to 5 wt %, preferably 0.1 wt % to 3 wt %, and more preferably 0.5 wt % to 2 wt % with respect to the total weight of the non-aqueous electrolyte solution.

When the amount of the compound represented by Formula 1 is less than 0.05 wt %, the fast charging performance improvement effect and the film improvement effect are insignificant, and when the amount of the compound is greater than 5 wt %, the resistance may increase and the oxidation stability may decrease due to the decomposition of the compound represented by Formula 1. Therefore, it is preferable that the amount of the compound represented by Formula 1 satisfies the above range.

(2) Additive

In one embodiment, the non-aqueous electrolyte solution of the present invention may optionally further include the following additives as necessary in order to prevent the electrolyte solution from being decomposed to cause collapse of an electrode in a high-voltage environment, or further improve low-temperature high-rate discharge characteristics, high-temperature stability, overcharge protection, and a battery swelling suppression effect at high temperatures.

The additive may be at least one selected from the group consisting of a carbonate-based compound, a sultone-based compound, a sulfate-based compound, a phosphate-based compound, a phosphite-based compound, a nitrile-based compound, an amine-based compound, a silane-based compound, a benzene-based compound, a lithium salt-based compound, an imidazole-based compound, and an ether-based compound.

The carbonate-based compound may be at least one selected from the group consisting of ethylene carbonate (EC), vinylene carbonate (VC), vinyl ethylene carbonate (VEC), fluoroethylene carbonate (FEC), and methyl prop-2-ynyl carbonate, and specifically, may be vinylene carbonate.

The sultone-based compound is a material capable of forming a stable solid electrolyte interphase (SEI) film on the surface of a negative electrode by a reduction reaction, and may be at least any one compound selected from the group consisting of 1,3-propane sultone (PS), 1,4-butane sultone, ethene sultone, 1,3-propene sultone (PRS), 1,4-butene sultone, and 1-methyl-1,3-propene sultone, and specifically may be 1,3-propane sultone (PS).

The sulfate-based compound is a material capable of forming a stable SEI film that does not crack even during high-temperature storage by being electrically decomposed on the surface of a negative electrode, and may be at least any one selected from the group consisting of ethylene sulfate (Esa), trimethylene sulfate (TMS), and methyl trimethylene sulfate (MTMS).

The phosphate-based compound or the phosphite-based compound may be at least any one selected from the group consisting of lithium difluoro(bisoxalato)phosphate, lithium difluoro phosphate, tris(trimethylsilyl)phosphate, tris(trimethylsilyl)phosphite, tris(2,2,2-trifluoroethyl)phosphate, and tris(trifluoroethyl)phosphite.

The nitrile-based compound may be at least any one selected from the group consisting of succinonitrile (SN), adiponitrile (ADN), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, ethylene glycol bis(propionitrile)ether (ASA3), 1,3,6-hexanetricarbonitrile (HTCN), 1,4-dicyano-2-butene (DCB), and 1,2,3-tris(2-cyanoethyl)propane (TCEP).

The amine-based compound may be triethanolamine, ethylenediamine or a mixture thereof, and the silane-based compound may be tetravinylsilane.

The benzene-based compound may be at least any one selected from the group consisting of fluorobenzene (FB), difluorobenzene, trifluorobenzene, tetrafluorobenzene, and hexafluorobenzene.

The lithium salt-based compound may be a compound different from the lithium salt included in the electrolyte, and may be at least any one compound selected from the group consisting of lithium difluoro phosphate (LiDFP; $LiPO_2F_2$), lithium bisoxalatoborate (LiBOB; $LiB(CO_2O_4)_2$), lithium tetrafluoroborate ($LiBF_4$), lithium difluoro(oxalato)borate (LiODFB), lithium tetraphenylborate, and lithium difluoro (oxalato) phosphate (LiDFOP).

The imidazole-based compound may be propargyl 1H-imidazole-1-carboxylate.

The ether-based compound may be at least any one selected from the group consisting of 1,1,2,2-tetrafluoroethyl-2,2,2-trifluoroethyl ether, bis(trifluoromethyl)-1,3-dioxolane, and 1,1,2,2-tetrafluoroethyl-2,2,3,3-tetrafluoropropyl ether.

The non-aqueous electrolyte solution according to an embodiment of the present invention may further include at least any one additive selected from the group consisting of vinylene carbonate (VC), 1,3-propane sultone (PS), vinylethylene carbonate (VEC), fluoroethylene carbonate (FEC), lithium difluoro oxalato borate, ethylene sulfate (Esa), propargyl 1H-imidazole-1-carboxylate, methyl prop-2-ynyl carbonate, ethylene glycol bis(propionitrile) ether, fluorobenzene, difluorobenzene, hexafluorobenzene, 1,1,2,2-tetrafluoroethyl-2,2,2-trifluoroethylether, bis(trifluoromethyl)-1,3-dioxolane and 1,1,2,2-tetrafluoroethyl-2,2,3,3-tetrafluoropropyl ether, and preferably, may include vinylene carbonate (VC), 1,3-propane sultone (PS), or a mixture thereof, and more preferably, may include vinylene carbonate (VC) and 1,3-propane sultone (PS). In this case, there is an advantage in that a more stable electrode film can be formed when used together with the compound represented by Formula 1, because there is an effect of forming a film on the surface of the electrode.

Meanwhile, an amount of the additive may be in a range of 0.1 wt % to 10 wt %, preferably, 0.3 wt % to 5 wt % based on the total weight of the non-aqueous electrolyte solution. When the additive content is within the above range, there is an effect of suppressing side reactions through the formation of the films on the positive electrode and the negative electrode.

(3) Organic Solvent

The non-aqueous electrolyte solution of the present disclosure includes an organic solvent.

Various organic solvents typically used in a lithium electrolyte may be used as the organic solvent without limitation. For example, the organic solvent may be a cyclic carbonate-based solvent, a linear carbonate-based solvent, a linear ester-based solvent, a cyclic ester-based solvent, a nitrile-based solvent, a fluorine-based solvent, or a mixture thereof.

In an embodiment of the present invention, the organic solvent may be a mixture of a cyclic carbonate-based solvent and a linear carbonate-based solvent, and in this case, it is possible to prepare an electrolyte solution having high ionic conductivity.

The cyclic carbonate-based solvent is a high viscous organic solvent having an advantage of being able to well dissociate lithium salts in the electrolyte due to high permittivity, and may be at least any one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and preferably, may be ethylene carbonate (EC).

In addition, the linear carbonate-based solvent is an organic solvent having low viscosity and low permittivity, and may be at least any one selected from the group consisting of dimethyl carbonate (DMC), diethyl carbonate (DEC), dipropyl carbonate, ethylmethyl carbonate (EMC), methylpropyl carbonate, and ethylpropyl carbonate, and preferably dimethyl carbonate (DMC).

The linear ester-based solvent may be at least any one selected from the group consisting of methyl acetate, ethyl acetate, propyl acetate, methyl propionate, ethyl propionate (EP), propyl propionate (PP), and butyl propionate, and preferably may be ethyl propionate, propyl propionate, or a mixture thereof.

The cyclic ester-based solvent may be at least any one selected from the group consisting of γ-butyrolactone, γ-valerolactone, γ-caprolactone, σ-valerolactone, and ε-caprolactone.

The nitrile-based solvent may be at least any one selected from the group consisting of succinonitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile and 4-fluorophenylacetonitrile, and may preferably be succinonitrile.

The fluorine-based solvent may be at least any one selected from the group consisting of 1,1,2,2-tetrafluoroethyl 2,2,3,3-tetrafluoropropyl ether, 2,2-bis(trifluoromethyl)-1,3-dioxolane, 1,1,2,2-tetrafluoroethyl 2,2,2-trifluoroethyl ether, trifluoroethyl phosphate, trifluoroethyl phosphite, ethyl 4,4,4-trifluorobutyrate, 1,2-ethanedisulfonyl difluoride, ethyl trifluoroacetate, ethyl pentafluoropropanoate, 1-fluoroethyl carbonate (F-EMC), 2,2,2-trifluoroethyl methyl carbonate (F3-EMC), difluoroethyl acetate, methyl difluoroacetate, ethyl difluoroacetate, and 1,1,2,2,3,3,4,4-octafluoro-5-(1,1,2,2,-tetrafluoroethoxy)pentane.

Remainders except for the amounts of the other components except for the organic solvent, for example, the compound represented by Formula 1, the additive, and the lithium salt in the total weight of the non-aqueous electrolyte may all be organic solvents unless otherwise stated.

(4) Lithium Salt

The non-aqueous electrolyte solution of the present disclosure includes a lithium salt.

Any lithium salt typically used in an electrolyte for a lithium secondary battery may be used as the lithium salt without limitation, and specifically, the lithium salt may include $Li^+$ as a cation, and may include at least one selected from $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2CO_4^-$, $BC_4O_8^-$, $BF_2C_2O_4CHF-$, $PF_4C_2O_4^-$, $PF_2C_4O_8^-$, $PO_2F_2^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, or $SCN^-$ as an anion.

Specifically, the lithium salt may be at least any one selected from the group consisting of $LiPF_6$, $LiClO_4$, $LiBF_4$, $LiN(FSO_2)_2$ (LiFSI), lithium bis(trifluoromethanesulfonyl) imide (LiTFSI), lithium bis(pentafluoroethanesulfonyl)imide (LiBETI), $LiSO_3CF_3$, $LiPO_2F_2$, lithium bis(oxalate) borate (LiBOB). lithium difluoro(oxalate)borate (LiODFB), lithium difluoro(bisoxalato) phosphate (LiDFOP), lithium tetrafluoro(oxalate) phosphate (LiTFOP), and lithium fluoromalonato(difluoro) borate (LiFMDFB), and may preferably be $LiPF_6$.

In an embodiment of the present invention, a concentration of the lithium salt in the non-aqueous organic solution containing the lithium salt and the organic solvent may be 0.5 M to 4.0 M, preferably, 0.5 M to 3.0 M, and more preferably, 0.8 M to 2.0 M. When the concentration of the lithium salt satisfies the above range, the effects of improving low-temperature output and cycle characteristics are sufficiently secured, and the viscosity and surface tension are prevented from being excessively increased, thereby obtaining an electrolyte solution having appropriate wetting.

Lithium Secondary Battery

Next, a lithium secondary battery according to one aspect of the present invention will be described.

The lithium secondary battery according to the present disclosure includes a positive electrode, a negative electrode, a separator disposed between the positive electrode and the negative electrode, and a non-aqueous electrolyte, and, in this case, the non-aqueous electrolyte is the non-aqueous electrolyte according to the present disclosure. Since the non-aqueous electrolyte has been described above, a description thereof will be omitted and other components will be described below.

(1) Positive Electrode

The positive electrode according to the present disclosure may include a positive electrode active material and be prepared by coating a positive electrode collector with a positive electrode slurry containing the positive electrode active material, a binder, a conductive agent, a solvent, etc., and then drying and rolling the coated positive electrode collector.

The positive electrode collector is not particularly limited so long as it has conductivity without causing adverse chemical changes in the battery, and, for example, stainless steel; aluminum; nickel; titanium; sintered carbon; or aluminum or stainless steel of which the surface is treated with carbon, nickel, titanium, silver, or the like may be used.

The positive electrode active material is a compound capable of reversibly intercalating and deintercalating lithium, and may be at least any one selected from the group consisting of LCO($LiCoO_2$); LNO($LiNiO_2$); LMO ($LiMnO_2$); $LiMn_2O_4$, $LiCoPO_4$; LFP($LiFePO_4$); and a lithium composite transition metal oxide including nickel (Ni), cobalt (Co), or manganese (Mn).

In an embodiment of the present invention, the positive electrode active material may be a lithium composite transition metal oxide having a nickel content of 60 mol % or more, preferably 70 mol % or more, and more preferably 80 mol % or more, with respect to the total metal excluding lithium.

In an embodiment of the present invention, the positive electrode active material may include a lithium composite transition metal oxide represented by Formula 2:

$Li_{1+x}(Ni_aCo_bMn_cM_d)O_2$            [Formula 2]

In Formula 2,

M is at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, 1+x, a, b, c, and d are each independently an atomic fraction of elements, and $-0.2 \leq x \leq 0.2$, $0.50 \leq a < 1$, $0 < b \leq 0.40$, $0 < c \leq 0.40$, $0 \leq d \leq 0.10$, and $a+b+c+d=1$.

1+x above denotes a lithium molar ratio in the lithium composite transition metal oxide, and x may satisfy $-0.1 \leq x \leq 0.2$ or $0 \leq x \leq 0.2$. When the molar ratio of lithium satisfies the above range, the crystal structure of the lithium composite transition metal oxide may be stably formed.

a above denotes a molar ratio of nickel among all metals excluding lithium in the lithium composite transition metal oxide, and may satisfy $0.60 \leq a < 1$, $0.70 \leq a < 1$, or $0.80 \leq a < 1$. When the molar ratio of nickel satisfies the above range, high energy density may be exhibited and high capacity may be achieved.

b above denotes a molar ratio of cobalt among all metals excluding lithium in the lithium composite transition metal oxide, and may satisfy $0 < b \leq 0.30$, $0 < b \leq 0.20$, or $0 < b \leq 0.10$. When the molar ratio of cobalt satisfies the above range, good resistance characteristics and output characteristics may be achieved.

c above denotes a molar ratio of manganese among all metals excluding lithium in the lithium nickel cobalt-based composite oxide, and may satisfy $0 < c \leq 0.30$, $0 < c \leq 0.20$, or $0 < c \leq 0.10$. When the molar ratio of manganese satisfies the above range, the structural stability of the positive electrode active material is exhibited excellent.

In an embodiment of the present invention, the lithium nickel cobalt-based composite oxide may include at least one doping element selected from W, Cu, Fe, V, Cr, Ti, Zr, Zn, Al, In, Ta, Y, La, Sr, Ga, Sc, Gd, Sm, Ca, Ce, Nb, Mg, B, or Mo, and preferably, may include Al as a doping element. In other words, d above which denotes the molar ratio of the doping element in all metals excluding lithium in the lithium composite transition metal oxide may satisfy $0 < d \leq 0.08$, $0 < d \leq 0.05$, or $0 < d \leq 0.03$.

For example, the lithium composite transition metal oxide may be at least any one selected from the group consisting of $Li(Ni_{0.6}Mn_{0.2}Co_{0.2})O_2$, $Li(Ni_{0.7}Mn_{0.15}Co_{0.15})O_2$, $Li(Ni_{0.8}Mn_{0.1}Co_{0.1})O_2$, and $Li(Ni_{0.9}Mn_{0.03}Co_{0.06}Al_{0.01})O_2$.

The positive electrode active material may be included in an amount of 80 wt % to 99 wt %, for example, 90 wt % to 99 wt % based on a total weight of solid content in the positive electrode slurry. In this case, when the amount of the positive electrode active material is 80 wt % or less, since energy density is reduced, capacity may be reduced.

The binder is a component that assists in the binding between the active material and the conductive agent and in the binding with the current collector, and may be commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, or various copolymers thereof.

In addition, the conductive agent is a material providing conductivity without causing adverse chemical changes in the battery, and may be added in an amount of 0.5 wt % to 20 wt % based on the total weight of the solid content in the positive electrode slurry.

For example, the conductive agent may be at least any one selected from carbon black such as acetylene black, Ketjen black, channel black, furnace black, lamp black, or thermal black; graphite powder such as natural graphite, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or a conductive material such as polyphenylene derivatives.

Furthermore, the solvent of the positive electrode slurry may include an organic solvent, such as N-methyl-2-pyrrolidone (NMP), and may be used in an amount such that desirable viscosity is obtained when the positive electrode active material, the binder, and the conductive agent are included. For example, the solvent may be included in an amount such that a concentration of the solid content in the positive electrode slurry containing the positive electrode active material, the binder, and the conductive agent is 40 wt % to 90 wt %, preferably, 50 wt % to 80 wt %.

(2) Negative Electrode

The negative electrode according to the present disclosure may include a negative electrode active material and be prepared by coating a negative electrode collector with a negative electrode slurry containing the negative electrode active material, a binder, a conductive agent, a solvent, etc., and then drying and rolling the coated negative electrode collector.

The negative electrode according to the present disclosure includes a negative electrode active material, and may be prepared by coating a negative electrode collector with a negative electrode slurry including the negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper; stainless steel; aluminum; nickel; titanium; fired carbon; copper or stainless steel that is surface-treated with one of carbon, nickel, titanium, silver, or the like; an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from a carbon material capable of reversibly intercalating/deintercalating lithium ions; metal or an alloy of lithium and the metal; a metal composite oxide; a material which may be doped and undoped with lithium; lithium metal; or a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon), hard carbon, mesophase pitch carbide, or fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

As the metal composite oxide, at least any one selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (where: Me is Mn, Fe, Pb, or Ge; Me' is Al, B, P, Si, Groups I, II and III elements of the periodic table, or halogen; $0 < x \leq 1$; $1 \leq y \leq 3$; and $1 \leq z \leq 8$) may be used.

The material, which may be doped and undoped with lithium, may include Si, SiOx ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, SnO2, and Sn—Y (where Y is an element selected from the group consisting of alkali metal, alkaline earth metal, a Group 13 element, a Group 14 element, transition metal, a rare earth element, and a combination thereof, and is not Sn), and a mixture of SiO2 and at least one thereof may also be used. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

Examples of the transition metal oxide may be lithium-containing titanium composite oxide (LTO), vanadium oxide, or lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, various copolymers thereof, or the like.

The conductive agent is a component for further improving the conductivity of the negative electrode active material, wherein the conductive agent may be added in an amount of 0.5 wt % to 20 wt % based on the total weight of the solid content in the negative electrode slurry. The conductive agent is not particularly limited as long as it has conductivity without causing adverse chemical changes in the battery, and, for example, may be at least any one selected from carbon black such as acetylene black, Ketjen black, channel black, furnace black, lamp black, or thermal black; graphite powder such as natural graphite, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or a conductive material such as polyphenylene derivatives.

The solvent of the negative electrode slurry may include water; or an organic solvent, such as NMP or alcohol, and may be used in an amount such that desirable viscosity is obtained when the negative electrode active material, the binder, the conductive agent, and the like are included. For example, the solvent may be included in an amount such that a concentration of the solid content in the negative electrode slurry including the negative electrode active material, the binder, and the conductive agent is in a range of 30 wt % to 80 wt %, for example, 40 wt % to 70 wt %.

(3) Separator

The lithium secondary battery according to the present disclosure includes a separator between the positive electrode and the negative electrode.

The separator separates the negative electrode and the positive electrode and provides a movement path of lithium ions, and any separator may be used as the separator without particular limitation as long as it is typically used in a lithium secondary battery, and particularly, a separator having excellent wettability of the electrolyte and excellent stability as well as low resistance to the transfer of electrolyte ions is preferable.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer; or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be used.

The lithium secondary battery according to the present disclosure as described above may be suitably used in portable devices, such as mobile phones, notebook computers, and digital cameras, and electric vehicles such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium or large sized device of a power tool; electric cars including an electric vehicle (EV), a hybrid electric vehicle, a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be preferably used as a unit cell in a medium-and-large-sized battery module including a plurality of battery cells.

Hereinafter, the present invention will be described in detail with reference to specific examples.

EXAMPLES

Example 1

(Preparation of Non-aqueous Electrolyte)

A non-aqueous organic solution was prepared by mixing ethylene carbonate (EC) and dimethyl carbonate (DMC) in a volume ratio of 30:70 and then dissolving $LiPF_6$ in the mixture so as to have a concentration of 1.0 M. A non-aqueous electrolyte solution (100 wt %) was prepared by mixing 1 wt % of the compound represented by Formula 1A in which the anion $A^-$ is $(CF_3SO_2)_2N^-$(TFSI$^-$), 2 wt % of vinylene carbonate (VC), 1 wt % of 1,3-propane sultone (PS), and the balance of the non-aqueous organic solution.

(Preparation of Lithium Secondary Battery)

A positive electrode slurry (solid content: 60 wt %) was prepared by adding $Li(Ni_{0.8}Co_{0.1}Mn_{0.1})O_2$ as a positive electrode active material, a conductive agent (carbon black), and a binder (polyvinylidene fluoride) to N-methyl-2-pyrrolidone (NMP) at a weight ratio of 97.5:1:1.5. A 15 μm thick aluminum (Al) thin film, as a positive electrode collector, was coated with the positive electrode slurry, dried, and then roll-pressed to prepare a positive electrode.

A negative electrode active material (graphite in which artificial graphite and natural graphite is blended in a weight ratio of 8:2), a binder (SBR-CMC), and a conductive agent (carbon black) were added in a weight ratio of 95:3.5:1.5 to water, which is a solvent, to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly was accommodated in a pouch-type battery case, and the prepared non-aqueous electrolyte was injected thereinto to prepare a lithium secondary battery.

Example 2

A lithium secondary battery was prepared in the same manner as in Example 1, except that the compound represented by Formula 1A, in which the anion $A^-$ is $(FSO_2)_2N^-$ (FSI$^-$), was used instead of the compound represented by Formula 1A, in which the anion $A^-$ is TFSI$^-$, when the non-aqueous electrolyte was prepared.

Example 3

A lithium secondary battery was prepared in the same manner as in Example 1, except that the amount of the compound represented by Formula 1A, in which the anion $A^-$ is TFSI$^-$, was changed to 5 wt % when the non-aqueous electrolyte was prepared.

Example 4

A lithium secondary battery was prepared in the same manner as in Example 1, except that the compound represented by Formula 1B, in which the anion $A^-$ is TFSI$^-$, was used instead of the compound represented by Formula 1A, in which the anion $A^-$ is TFSI$^-$, when the non-aqueous electrolyte was prepared.

Example 5

A lithium secondary battery was prepared in the same manner as in Example 1, except that the compound represented by Formula 1C, in which the anion $A^-$ is TFSI$^-$, was used instead of the compound represented by Formula 1A, in which the anion $A^-$ is TFSI$^-$, when the non-aqueous electrolyte was prepared.

Example 6

A lithium secondary battery was prepared in the same manner as in Example 1, except that the compound represented by Formula 1D, in which the anion A– is TFSI–, was used instead of the compound represented by Formula 1A, in which the anion A– is TFSI–, when the non-aqueous electrolyte was prepared.

Comparative Example 1

A lithium secondary battery was prepared in the same manner as in Example 1, except that the compound represented by Formula 1A, in which the anion $A^-$ is TFSI$^-$, was not added when the non-aqueous electrolyte was prepared.

Comparative Example 2

A lithium secondary battery was prepared in the same manner as in Example 1, except that the compound represented by Formula B-1 below was used instead of the compound represented by Formula 1A, in which the anion $A^-$ was TFSI$^-$, when the non-aqueous electrolyte was prepared.

[Formula B-1]

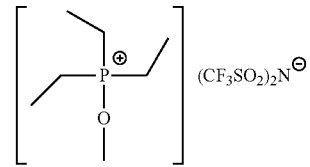

Comparative Example 3

A lithium secondary battery was prepared in the same manner as in Example 1, except that the compound represented by Formula B-2 below was used instead of the compound represented by Formula 1A, in which the anion A− was TFSI−, when the non-aqueous electrolyte was prepared.

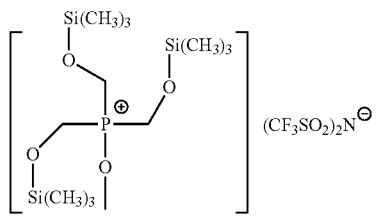

[Formula B-2]

Experimental Example 1: Fast Charging Performance Evaluation

After a lithium secondary battery having a state of charge (SOC) of 3% in each of the lithium secondary batteries prepared in the Examples and Comparative Examples was prepared, charging was performed while changing C-rate according to the SOC state as shown in Table 1 below, and voltage profiles were measured by checking voltage values at 1 second intervals for each charging section.

TABLE 1

|  | Charging Time (sec) | C-rate (C) |
|---|---|---|
| SOC 3%-61% | 880 | 2.5 |
| SOC 62%-78% | 620 | 1 |

Thereafter, the amount of charge when each battery was charged in the CC mode by setting an end condition with the voltage value for each section obtained in each section was recorded. Then, each battery was discharged to a SOC of 3% at 0.5 C in the CC mode again.

The charging and discharging was set as 1 cycle, the initial capacity, which is the discharge capacity of the first cycle, was measured, the discharge capacity was measured after 100 cycles were performed, the capacity retention was calculated after fast charging using Equation (1) below, and the results are shown in Table 2 below.

Equation (1): Capacity retention after fast charging (%)= (capacity measured after 100 cycles/initial capacity)×

Experimental Example 2: Low-temperature Storage Evaluation

The lithium secondary batteries prepared in the Examples and Comparative Examples were charged under a constant current/constant voltage condition at 0.2 C rate to 4.2 V, and were cut-off charged at 0.05 C, and the discharge capacity after discharging at 0.2 C to 2.5 V was set as the initial discharge capacity. Subsequently, the batteries were charged under a constant current/constant voltage condition at 0.2 C rate to 4.2 V and cut-off charged at 0.05 C, and stored at 0° C. for 2 weeks and then residual capacity was measured. The capacity retention (%) after storage at a low temperature (0° C.) compared to the initial discharge capacity (100%) was calculated and the results are shown in Table 2 below.

Experimental Example 3: High-Temperature Storage Evaluation

After the lithium secondary batteries prepared in Examples and Comparative Examples were charged at a SOC of 100% and exposed at a high temperature (45° C.) for 30 days, the amount of gas generation such as CO and $CO_2$ in the batteries was measured. When the amount of gas generation measured in Comparative Example 1 was 100%, the relative amount of gas generation of each battery was calculated and the results are shown in Table 2 below.

TABLE 2

|  | Phosphonium salt compound | | Experimental Example 1 (Fast Charging) Capacity retention (%) | Experimental Example 2 (low-temperature storage) Capacity retention (%) | Experimental Example 3 (high-temperature storage) Amount of gas generation (%) |
|---|---|---|---|---|---|
|  | Structure | Amount (wt %) | | | |
| Example 1 | 1A (TFSI−) | 1 | 88 | 79 | 62 |
| Example 2 | 1A (TFSI−) | 1 | 90 | 82 | 67 |
| Example 3 | 1A (TFSI−) | 5 | 84 | 73 | 58 |
| Example 4 | 1B (TFSI−) | 1 | 87 | 80 | 60 |
| Example 5 | 1C (TFSI−) | 1 | 94 | 82 | 79 |
| Example 6 | 1D (TFSI−) | 1 | 94 | 84 | 76 |
| Comparative Example 1 | Unused | — | 67 | 52 | 100 |
| Comparative Example 2 | B-1 | 1 | 72 | 60 | 85 |
| Comparative Example 3 | B-2 | 1 | 78 | 67 | 92 |

From the results of Table 2, it may be confirmed that the batteries in Examples 1 to 6 to which the non-aqueous electrolyte solution containing the compound represented by Formula 1 as an additive is applied maintain to have a high charging capacity during fast charging, have excellent output characteristics even after low-temperature storage, as well as have excellent thermal stability due to a small amount of gas generated after high-temperature storage.

On the other hand, it may be confirmed that in the case of Comparative Examples 1 to 3 to which the non-aqueous electrolyte solution containing, as an additive, the phosphonium salt additive including no compound represented by Formula 1 or no alkyne is applied, poor results are obtained in all evaluation items compared to Examples.

The invention claimed is:

1. A non-aqueous electrolyte solution for a lithium secondary battery, the non-aqueous electrolyte solution comprising a lithium salt; an organic solvent; and a compound represented by Formula 1:

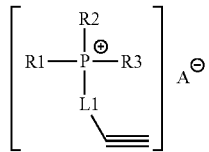

[Formula 1]

wherein, in Formula 1,

R1 to R3 are each independently an alkyl group having 1 to 6 carbon atoms and optionally substituted with a fluorine, an alkenyl group having 2 to 6 carbon atoms and optionally substituted with a fluorine, an alkynyl group having 2 to 6 carbon atoms and optionally substituted with a fluorine, or —R'OSi(R4)$_3$;

R' is a direct linkage; an alkylene group having 1 to 6 carbon atoms and optionally substituted with a fluorine, an alkenylene group having 2 to 6 carbon atoms and optionally substituted with a fluorine, or an alkynylene group having 2 to 6 carbon atoms and optionally substituted with a fluorine;

R4 is an alkyl group having 1 to 6 carbon atoms;

L1 is —(CO)$_m$O(CH$_2$)$_n$—;

m is 0 or 1;

n is an integer of 0 to 5; and

A$^-$ is (CF$_3$SO$_2$)$_2$N$^-$, (FSO$_2$)$_2$N$^-$, PF$_6^-$, PO$_2$F$_2^-$, BF$_4^-$, ClO$_4^-$, (C$_2$O$_4$)BF$_2^-$, HSO$_4^-$, CF$_3$SO$_3^-$, (C$_2$F$_5$SO$_2$)$_2$N$^-$, C(CF$_2$SO$_2$)$_3^-$, AsF$_6^-$, SbF$_6^-$, AlCl$_4^-$, NbF$_6^-$, or CF$_3$CO$_2^-$.

wherein the compound represented by Formula 1 is included in an amount of 0.05 wt % to 5 wt % with respect to a total weight of the non-aqueous electrolyte solution.

2. The non-aqueous electrolyte solution of claim 1, wherein the compound represented by Formula 1 is represented by Formula 1-1 or Formula 1-2:

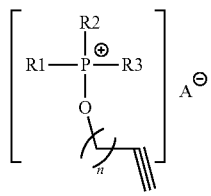

[Formula 1-1]

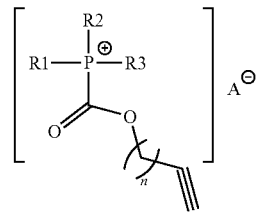

[Formula 1-2]

wherein, in Formula 1-1 and Formula 1-2,

R1 to R3, n, and A$^-$ are the same as defined in Formula 1.

3. The non-aqueous electrolyte solution of claim 1, wherein R1 to R3 are each independently —R'OSi(CH$_3$)$_3$, and R' is a direct linkage or an alkylene group having 1 to 6 carbon atoms.

4. The non-aqueous electrolyte solution of claim 3, wherein R' is a methylene group.

5. The non-aqueous electrolyte solution of claim 1, wherein each of R1 to R3 is an ethylene group.

6. The non-aqueous electrolyte solution of claim 1, wherein A$^-$ is (CF$_3$SO$_2$)$_2$N$^-$ or (FSO$_2$)$_2$N$^-$.

7. The non-aqueous electrolyte solution of claim 1, further comprising at least one additive selected from ethylene carbonate, vinylene carbonate, 1,3-propane sultone, vinylethylene carbonate, fluoroethylene carbonate, lithium difluoro oxalato borate, ethylene sulfate, propargyl 1H-imidazole-1-carboxylate, methyl prop-2-ynyl carbonate, ethylene glycol bis(propionitrile) ether, fluorobenzene, difluorobenzene, hexafluorobenzene, 1,1,2,2-tetrafluoroethyl-2,2,2-trifluoroethylether, bis(trifluoromethyl)-1,3-dioxolane, or 1,1,2,2-tetrafluoroethyl-2,2,3,3-tetrafluoropropyl ether.

8. The non-aqueous electrolyte solution of claim 1, wherein the organic solvent is a mixture of a cyclic carbonate-based solvent and a linear carbonate-based solvent.

9. A lithium secondary battery comprising:

a positive electrode including a positive electrode active material;

a negative electrode including a negative electrode active material;

a separator disposed between the positive electrode and the negative electrode; and the non-aqueous electrolyte solution of claim 1.

10. The lithium secondary battery of claim 9, wherein the positive electrode active material comprises a lithium composite transition metal oxide represented by Formula 2:

$$Li_{1+x}(Ni_aCo_bMn_cM_d)O_2$$ [Formula 2]

wherein, in Formula 2,

M is at least one selected from W, Cu, Fe, V, Cr, Ti, Zr, Zn, Al, In, Ta, Y, La, Sr, Ga, Sc, Gd, Sm, Ca, Ce, Nb, Mg, B, or Mo, 1+x, a, b, c, and d are each an atomic fraction of Li, Ni, Co, Mn and M, respectively, and −0.2≤x≤0.2, 0.50≤a<1, 0<b≤0.40, 0<c≤0.40, 0≤d≤0.10, and a+b+c+d=1.

11. The non-aqueous electrolyte solution of claim 1, wherein the compound represented by Formula 1 is represented by any one of Formulae 1A, 1B, 1C or 1D:

[Formula 1A]

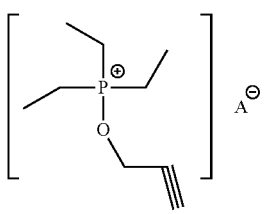

[Formula 1B]

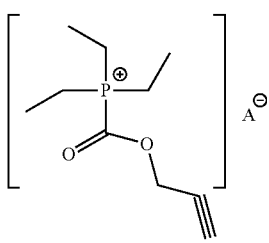

[Formula 1C]

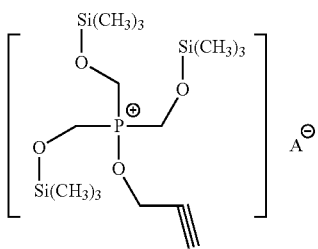

[Formula 1D]

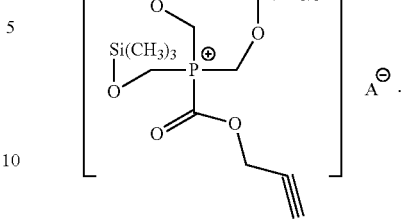

12. The non-aqueous electrolyte solution of claim 7, wherein the at least one additive is included in an amount of 0.1 wt % to 10 wt % based on a total weight of the non-aqueous electrolyte solution.

13. The non-aqueous electrolyte solution of claim 1, wherein the lithium salt is at least one selected from $LiPF_6$, $LiClO_4$, $LiBF_4$, $LiN(FSO_2)_2$, Lithium bis(trifluoromethanesulfonyl)imide, lithium bis(pentafluoroethanesulfonyl)imide, $LiSO_3CF_3$, $LiPO_2F_2$, lithium bis(oxalate)borate, lithium difluoro(oxalate)borate, lithium difluoro(bisoxalato) phosphate, lithium tetrafluoro(oxalate) phosphate, or lithium fluoromalonato(difluoro) borate.

14. The lithium secondary battery of claim 10, wherein the lithium composite transition metal oxide comprises at least one selected from $Li(Ni_{0.6}Mn_{0.2}Co_{0.2})O_2$, $Li(Ni_{0.7}Mn_{0.15}Co_{0.15})O_2$, $Li(Ni_{0.8}Mn_{0.1}Co_{0.1})O_2$, or $Li(Ni_{0.9}Mn_{0.03}Co_{0.06}Al_{0.01})O_2$.

* * * * *